April 23, 1957  J. S. KESSLER  2,789,844
SEALED JOINT FOR FLANGED PIPE WITH OPPOSED PACKING GROOVES
Filed Oct. 20, 1952
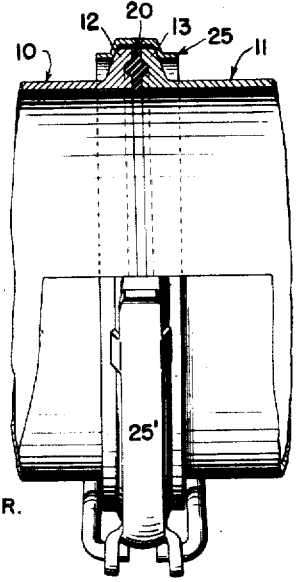
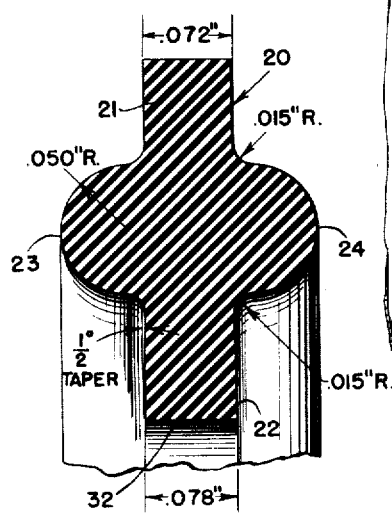
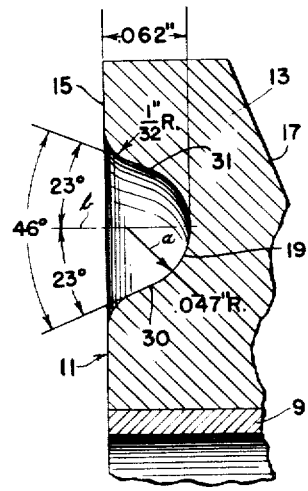
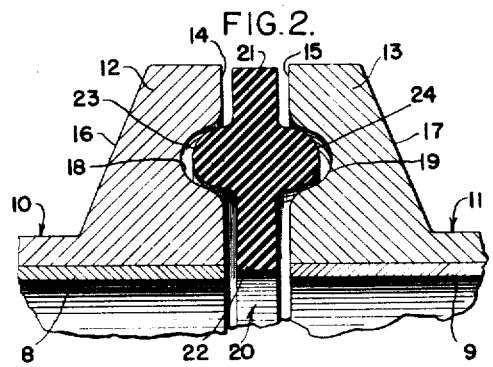
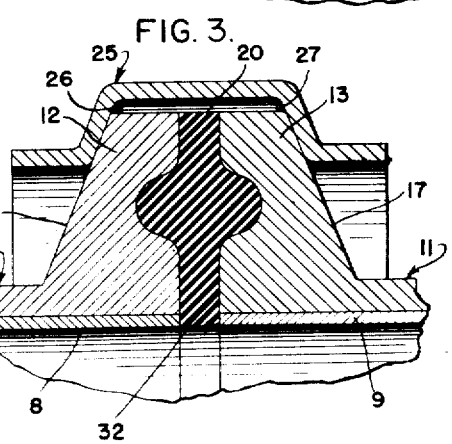
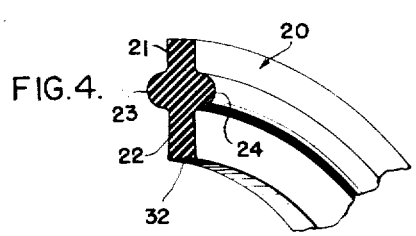
INVENTOR.
Joseph S. Kessler
BY
ATTORNEYS

United States Patent Office 2,789,844
Patented Apr. 23, 1957

2,789,844

SEALED JOINT FOR FLANGED PIPE WITH OPPOSED PACKING GROOVES

Joseph S. Kessler, Kenosha, Wis., assignor, by mesne assignments, to Ladish Co., Cudahy, Wis., a corporation of Wisconsin Application October 20, 1952, Serial No. 315,689

2 Claims. (Cl. 285—336)

This invention relates to improvements in sealed joints, and more particularly to joints which have special applicability for use in sanitary piping systems.

It is a general object of the invention to provide a joint which can replace the conventional union nut assembly, the improved joint being less expensive in initial cost, faster to install and take apart, easier to clean, more sanitary, and having longer life.

A more specific object of the invention is to provide a joint of the class described wherein the connection is effected by means of a snap-action clamping ring, and wherein there is novel means at the joint to provide an effective seal when the clamping ring is taken up, said means also providing a sanitary condition at the joint.

A further, more specific object of the invention is to provide a sealed joint which includes a novel sealing gasket, the latter having an annular bead on each of its opposite sides, which beads coact with annular grooves in the ferrule ends to effect a tight seal.

A further specific object of the invention is to provide a construction as above described wherein the gasket is resilient and generally wedge-shaped in cross section near its inner periphery so that the tightest seal is effected at this location to prevent the entrance of liquid into the joint.

A still further object of the invention is to provide a sealed joint as above described wherein, when the clamp is tightened, the inner annular edge of the gasket is brought flush with the adjoining tube surfaces to avoid the formation of an unsanitary recess at the joint.

Other objects of the invention are to provide an improved sealed joint which can be adapted for use in connection with various types of fittings, which is neat in appearance, which is strong and durable, and which is otherwise well adapted for the purposes described.

With the above and other objects in view, the invention consists of the improved sealed joint and all of its parts and combinations as set forth in the claims, and all equivalents thereof.

In the drawing accompanying and forming a part of this specification, wherein one complete embodiment of the preferred form of the invention is shown, and wherein like characters of reference indicate the same parts in all of the views:

Fig. 1 is a fragmentary side elevational view showing a pair of tubes connected by the improved sealed joint, parts being broken away and shown in section.

Fig. 2 is an enlarged, fragmentary, axial sectional view of a portion of the improved joint construction before the parts are placed in axial compression;

Fig. 3 is a view similar to Fig. 2, showing the parts in clamping and sealing condition;

Fig. 4 is a fragmentary perspective view of the resilient sealing gasket;

Fig. 5 is an enlarged cross sectional view of a sealing gasket constructed in accordance with the invention and showing preferred dimensions; and Fig. 6 is an enlarged fragmentary axial sectional view of a sealing flange constructed in accordance with the invention and adapted for use with the sealing ring of Fig. 5.

Referring more particularly to Fig. 1 of the drawing, the numerals 10 and 11 indicate a pair of metal tubes usually in the form of ferrules which are connected over the ends of the pipes 8 and 9 or other fittings of a sanitary piping system. The tubes 10 and 11 are formed respectively with radially outwardly projecting end flanges 12 and 13 having substantially flat annular end faces 14 and 15 (see Fig. 2) and having tapered outer faces 16 and 17. The flanges 12 and 13 are formed in the faces 14 and 15 with annular grooves 18 and 19 which may be identical with each other and which may also be coaxial with their respective flanges.

Each of the grooves 18 and 19, when viewed in cross section, has a bottom portion which is formed on a radius. One preferred radius is indicated in Fig. 6 by the arrow (A) which is shown as .047 of an inch. Near the face of each of the members 12 and 13 the groove is flared outwardly, preferably on a 1/32" radius, as shown in Fig. 6. Between the bottom portion, which as before stated is formed on the radius (a), and the outwardly flared portions there are sidewall portions 30 and 31 which are straight and which, in the preferred form, preferably diverge from the center line (b) at an angle of 23°, as shown in Fig. 6.

An annular sealing gasket 20 of synthetic rubber made by polymerization of chloroprene such as neoprene or a butadiene copolymer or other suitable relatively hard but resilient material is normally positioned between the flanges 12 and 13. It is formed with an outwardly directed portion 21 which is rectangular in cross-section. An inwardly directed portion 22 is generally wedge-shaped in cross section, having its greatest axial thickness at its inner edge 32. By referring to Fig. 5 it will be noted that the thickness at 32 is greater than the thickness of the portion 21. The gasket 20 also has a pair of oppositely projecting annular beads 23 and 24, the cross-sectional shape of which is semi-circular and drawn on a true radius as shown in Fig. 5, said radius being .050 of an inch in the example illustrated.

Fig. 5 shows the dimensions of a sealing gasket 20 which has worked out satisfactorily when used with a pair of flanged elements having the dimensions shown in Fig. 6. It will be noted in Fig. 2, that the cross-sectional length of the gasket portion 22 is less than the radial distance between the grooves 18 and 19 and the inner surfaces of tubes 8 and 9.

The improved joint is held in assembled condition by a toggle-type spring type split ring clamp 25 having the usual pivoted clamping lever 25' and having divergent annular inner surfaces 26 and 27 (Fig. 3) which engage the surfaces 16 and 17 of the flanges 12 and 13 to urge the latter toward each other. When the band 25 is tightened on flanges 12 and 13 the annular ribs 23 and 24 enter grooves 18 and 19.

Since the ribs 23 and 24, when viewed in cross section as in Fig. 5, are formed on a true radius, and since the grooves which they enter are formed only partially on a true radius, a certain deformation of the ribs takes place under the clamping pressure. It is to be noted that the bottoms of the grooves 18 and 19 are struck on a radius (a) which, in the illustrated embodiment, is .047 of an inch, whereas the radius of the ribs is slightly larger being shown as .050 of an inch. Thus, the inner portions of the ribs must deform in order to fit the bottoms of the grooves. In addition, the flat portions 30 and 31 of the grooves press against rounded portions of the ribs to provide an extremely effective seal.

In addition, tightening of clamp 25 causes axial compression of the portions 21 and 22 of the sealing gasket 20, and since the inner part of portion 22 is thicker than the portion 21, said inner part is compressed to a greater extent than is any other gasket portion. This compression causes the portion 22 to flow radially inwardly sufficiently to bring the inner annular edge 32 from its condition of Fig. 2 to its condition of Fig. 3 flush with the inner surfaces of tubes 8 and 9, to provide a smooth surface free from a recess at the joint. In addition, the wedge shape of portion 22 provides the greatest sealing action at the point closest to the inner surfaces of the tubes 8 and 9.

The improved joint construction can be quickly disassembled for cleaning purposes and is therefore especially well adapted for use in saintary piping systems. In addition, all screw threading is eliminated, and all parts are easily cleaned.

Various changes and modifications may be made without departing from the spirit of the invention, and all of such changes are contemplated, as may come within the scope of the claims.

What I claim is:

1. A joint construction comprising a pair of coaxial tubular members of like internal diameter having coopating annular parallel end faces flush with the ends of the tubular members, at least one of said faces having an annular groove, an annular resilient sealing gasket interposed coaxially between said annular end faces, and having a preformed annular rib received in said annular groove, said gasket having an inner portion which is wedge-shaped in cross-section with the widest portion of said wedge near the inner periphery, and said gasket having its inner annular edge of greater diameter than the internal diameters of the tubular members so that when said gasket is coaxial with the tubular members with the rib in and partly filling said groove, said inner annular edge is spaced radially outwardly from the inner surfaces of said tubes before the gasket is compressed, means for applying an axial compressive stress on said gasket from the end faces of the tubes, said annular edge diameter of the gasket and the material of the gasket being such that when a sufficient amount of said axial compressive stress is exerted to cause the annular rib of the gasket to completely fill said annular groove, then said wedge-shaped cross sectional portion of the gasket is deformed radially inwardly an amount just sufficient to position said inner annular edge of the gasket flush with the inner surfaces of said tubes.

2. A joint construction comprising a pair of coaxial tubular members of like internal diameter having cooperating outwardly projecting parallel end flanges flush with the ends of the tubular members, said end flanges having cooperating annular end faces each of which is provided with an annular groove, the opposite face of each flange being outwardly tapered, clamping means coacting with said tapered faces to draw said flanges together, an annular sealing gasket of relatively hard resilient material interposed coaxially between said annular end faces and having oppositely disposed preformed annular ribs received in said annular grooves, said gasket having an inner portion which is wedge shaped in cross section with the widest portion of said wedge near the inner periphery, and said gasket having its inner annular edge of greater diameter than the internal diameters of said tubular members so that when said gasket is coaxial with the tubular members with the ribs in and partly filling said grooves said edge is spaced radially outwardly from the inner surfaces of said tubes before the gasket is compressed, said annular edge diameter of the gasket and the material of the gasket being such that when the clamping means is in clamping position with respect to the tapered faces of the flanges of the tubular members then the ribs completely fill the annular grooves and the wedge shaped cross sectional portion of the gasket is deformed radially inwardly an amount just sufficient to position said annular edge flush with the inner surfaces of said tubes.

References Cited in the file of this patent

UNITED STATES PATENTS

| 261,086 | Dummer et al. | July 11, 1882 |
| 508,765 | Rouse | Nov. 14, 1893 |
| 1,071,235 | Hutton | Aug. 26, 1913 |
| 1,290,590 | Lehew | Jan. 7, 1919 |
| 1,868,906 | Keulers | July 26, 1932 |
| 1,940,729 | Pfefferle | Dec. 26, 1933 |
| 2,330,425 | Hilton | Sept. 28, 1943 |
| 2,455,982 | Dowty | Dec. 14, 1948 |
| 2,688,500 | Scott | Sept. 7, 1954 |

FOREIGN PATENTS

| 584,100 | France | Nov. 13, 1924 |
| 814,977 | Germany | Sept. 27, 1951 |

Disclaimer 2,789,844.—*Joseph S. Kessler*, Kenosha, Wis. SEALED JOINT FOR FLANGED PIPE WITH OPPOSED PACKING GROOVES. Patent dated Apr. 23, 1957. Disclaimer filed May 1, 1957, by the inventor and the assignee, *Ladish Company*.

Hereby enter this disclaimer to the portion of the term of the patent subsequent to Feb. 5, 1974.

[*Official Gazette June 4, 1957.*]